United States Patent
Jeon et al.

(10) Patent No.: US 12,316,495 B2
(45) Date of Patent: May 27, 2025

(54) SYSTEM PERFORMANCE DEGRADATION MITIGATION BASED ON PRIORITIZABLE MITIGATING ACTIONS

(71) Applicant: ROKU, INC., San Jose, CA (US)

(72) Inventors: Jinyoung Jeon, San Jose, CA (US); Don Ma, San Jose, CA (US); Vladimir Krivopalov, Matthews, NC (US); Shaokang Tan, Saratoga, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/232,474

(22) Filed: Aug. 10, 2023

(65) Prior Publication Data
US 2025/0055757 A1    Feb. 13, 2025

(51) Int. Cl.
*H04L 41/0823* (2022.01)
(52) U.S. Cl.
CPC ............................... *H04L 41/0823* (2013.01)
(58) Field of Classification Search
CPC ...... H04L 41/0823; G06N 5/045; G06F 3/015
USPC .......................................................... 709/220
See application file for complete search history.

(56) References Cited

U.S. PATENT DOCUMENTS

2012/0239848 A1 * 9/2012 Alon ..................... G06F 13/28
710/308

FOREIGN PATENT DOCUMENTS

| EP | 2840464 A1 * | 2/2015 | .............. G06F 11/34 |
| GB | 2557674 A  * | 6/2018 | .............. G06N 20/00 |

* cited by examiner

*Primary Examiner* — Glenford J Madamba
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for mitigating performance degradation of a computing device. In an embodiment, configuration setting(s) for mitigating performance degradation of the computing device are received from a data source external to the computing device. An order of actions for mitigating the performance degradation is determined based on the configuration setting(s). A notification that utilization of at least one compute resource of the computing device has met a degradation condition is received. Action(s) to mitigate the performance degradation are performed based on the notification in accordance with the determined order of actions.

20 Claims, 10 Drawing Sheets

| Severity Level | Threshold | Mitigating Action(s) |
|---|---|---|
| 1 | 64MB | Call callback function(s) of OS component(s) to free memory resources thereof |
| 2 | 48MB | Terminate Background Application(s) and/or Delete Memory-Consuming Artificats (e.g., Decompile Add-Ons (or Other Components of Background Application(s))) |
| 3 | 10MB | Terminate Foreground Application(s) |

| Severity Level | Threshold | Mitigating Action(s) |
|---|---|---|
| 1 | 64MB | Call callback function(s) of OS component(s) to free memory resources thereof |
| 2 | 48MB | Terminate Background Application(s) and/or Delete Memory-Consuming Artificats (e.g., Decompile Add-Ons (or Other Components of Background Application(s))) |
| 3 | 10MB | Terminate Foreground Application(s) |

FIG. 5

SYSTEM PERFORMANCE DEGRADATION MITIGATION BASED ON PRIORITIZABLE MITIGATING ACTIONS

BACKGROUND

Field

This disclosure is generally directed to techniques for mitigating performance degradation of a media device.

SUMMARY

Provided herein are a system, apparatus, device, method and/or computer program product embodiments, and/or combinations and sub-combinations thereof, for mitigating performance degradation of a computing device. In an embodiment, one or more configuration settings for mitigating the performance degradation of the computing device are received from a data source external to the computing device. An order of actions for mitigating the performance degradation is determined based on the configuration setting(s). A first notification that utilization of at least one compute resource of the computing device has met a degradation condition is received. Action(s) to mitigate the degradation are performed based on the first notification in accordance with the determined order of actions.

In an embodiment, the degradation condition is defined by the configuration setting(s).

In another embodiment, subsequent to performing at least one first action of the action(s), the performing of the action(s) is halted. An indication of the at least one first action performed is maintained. The performing of the action(s) is resumed based on the indication by performing at least one second action of the action(s) that is subsequent to the at least one first action in the determined order of actions.

In yet another embodiment, the determined order of actions is maintained via a data structure, and determining the order of actions for mitigating the performance degradation comprises rearranging, via the data structure, the order of actions such that at least one action of the one or more actions that is configured to be originally performed before a second action of the one or more actions is reconfigured to be performed after the second action.

In still another embodiment, the at least one compute resource comprises at least one of at least one memory of the computing device, at least one processor of the computing device, at least one network to which the computing device is communicatively coupled, or at least one storage device of the computing device.

In a further embodiment, the degradation condition comprises at least one of an available amount of the at least one memory meeting a first predetermined threshold, a percentage of time tasks are delayed based on a memory allocation time of the at least one memory meeting a second predetermined threshold, a measure of processing usage of the at least one processor meeting a third predetermined threshold, a measure of network usage associated with the at least one network meeting a fourth predetermined threshold, or a measure of utilization of the at least one storage device meeting a fifth predetermined threshold.

In yet a further embodiment, the action(s) comprise at least one of causing a second notification indicative of the degradation condition to be provided to an application or service of an operating system executing on the computing device, causing at least one add-on installed on the computing device to be decompiled, or causing at least one of a background application executing on the computing device or a foreground application executing on the computing device to be terminated.

In a further embodiment, determining the order of actions for mitigating the performance degradation comprises determining the order of actions based on at least one of a usage frequency of at least one of the application or service of the operating system, the at least one add-on, the background application, or the foreground application or an amount of memory freed based on each action in the order of actions.

BRIEF DESCRIPTION OF THE FIGURES

The accompanying drawings are incorporated herein and form a part of the specification.

FIG. 5 illustrates a data structure representative of a mapping according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
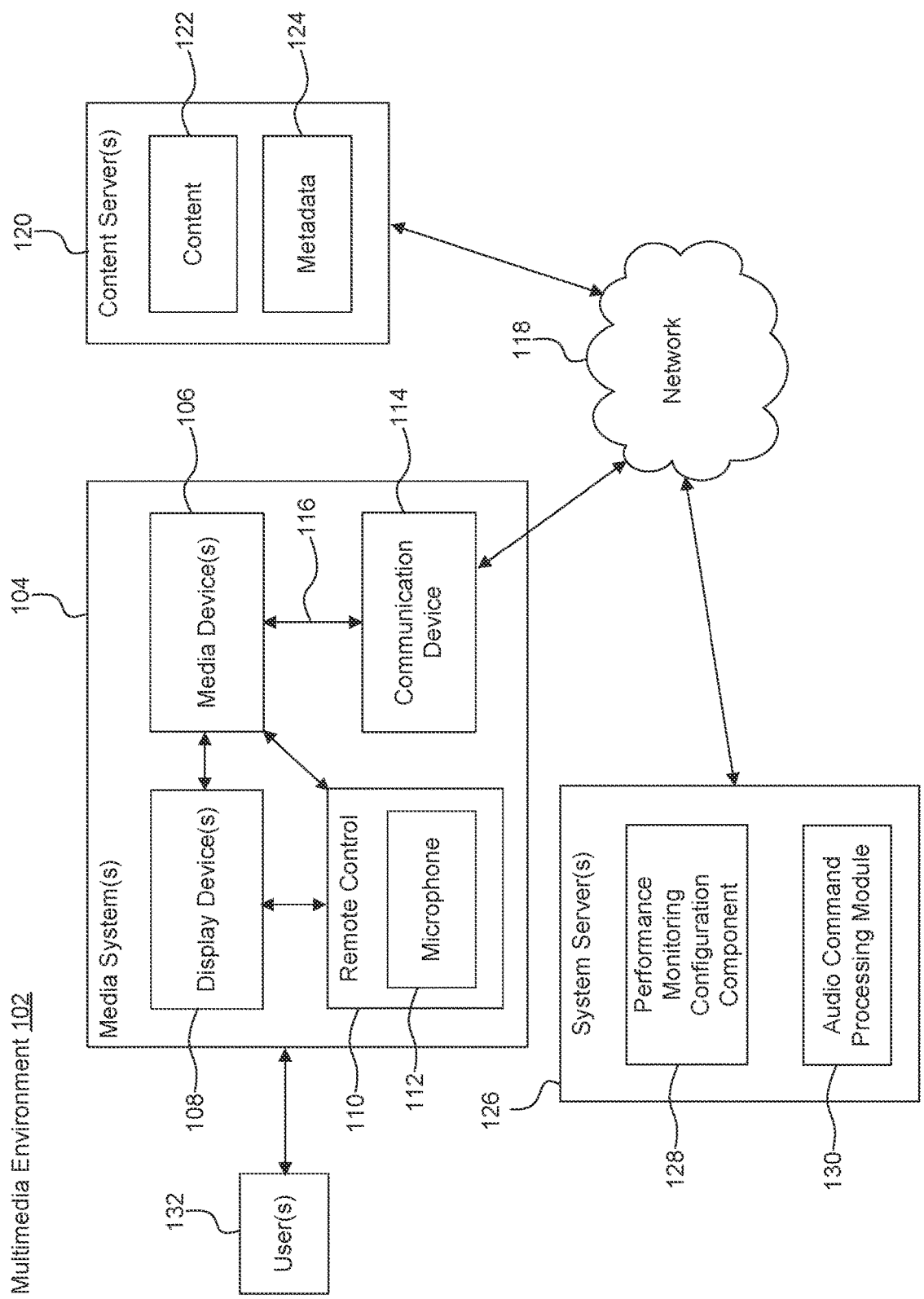
FIG. 1 illustrates a block diagram of a multimedia environment, according to some embodiments.

Compute resources of a digital system may be managed by tracking characteristics thereof, such as memory pressure, and taking timely actions to mitigate performance issues. Certain implementations perform mitigation actions in a fixed order that is specified in device firmware. For example, when the amount of available memory reaches a first threshold (e.g., 64 megabytes), callback functions of operating system (OS) components may be called to free memory resources for such OS components, followed by terminating background applications and/or decompiling add-ons or other components (e.g., libraries) of the background applications in a predetermined sequence. The order of these actions may not be changed at runtime. Instead, if a change in the order is required, firmware modification may be needed. Moreover, if such actions are performed sequentially, stopped, and then resumed, the first action is performed again instead of resuming from the next actions.

Embodiments described herein may address some or all of the foregoing issues related to performance degradation mitigation. For instance, one or more configuration settings from a data source external to a computing device may be received. The settings may define and/or modify an order in which action(s) for mitigating the performance degradation are to be performed. The settings may be received and implemented during runtime without requiring any firmware updates. When a determination is made that the computing device is suffering from performance degradation, the computing device may perform the action(s) in accordance with the order defined by the configuration settings. The computing device may perform the action(s) until the performance degradation is mitigated. The computing device may also maintain an indication of the last action performed in the order of action(s). When a subsequent determination that the computing device is suffering from performance degradation is made, the computing device may resume the action(s) from the last action performed in accordance with the order.

For example, in embodiments, configuration setting(s) for mitigating performance degradation of the computing device are received from a data source external to the computing device. An order of actions for mitigating the performance degradation is determined based on the configuration setting(s). A first notification that utilization of at least one compute resource of the computing device has met a degradation condition is received. Action(s) to mitigate the degradation are performed based on the first notification in accordance with the determined order of actions.

Such actions include, but are not limited to, freeing memory (e.g., by terminating applications, decompiling certain components of such applications (e.g., add-ons, libraries, etc.), dropping (e.g., clearing) caches, etc.), CPU scaling, I/O throttling, etc. Accordingly, such actions may improve the functioning, performance, and stability of the system, along with the user experience of a user utilizing the system, by preventing crashes, reboots, and user interface lagging. The order of action(s) may be prioritized in accordance with the configuration setting(s) based on, for example, the usage frequency of the applications (and/or components thereof) and/or the amount of memory freed as a result of performing such actions. This way, compute resources utilized by lower priority applications (or components thereof) may be freed more quickly, while higher priority applications (or components thereof) may retain their compute resources for a longer duration. This helps reduce the workload of unnecessary resource cleanup and subsequent loading of data into memory. Moreover, the prioritized order may enable memory to be freed faster and more accurately, thereby reducing system crashes and reboots caused by memory shortages.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The system servers 126 may include a degradation monitoring configuration component 128. Degradation monitoring configuration component 128 may be configured to provide a configuration comprising settings for monitoring and mitigating performance degradation to media device 106 over network 118. Media device 106 may be configured to implement the configuration settings during runtime thereof. Additional details regarding degradation monitoring configuration component 128 are described below.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
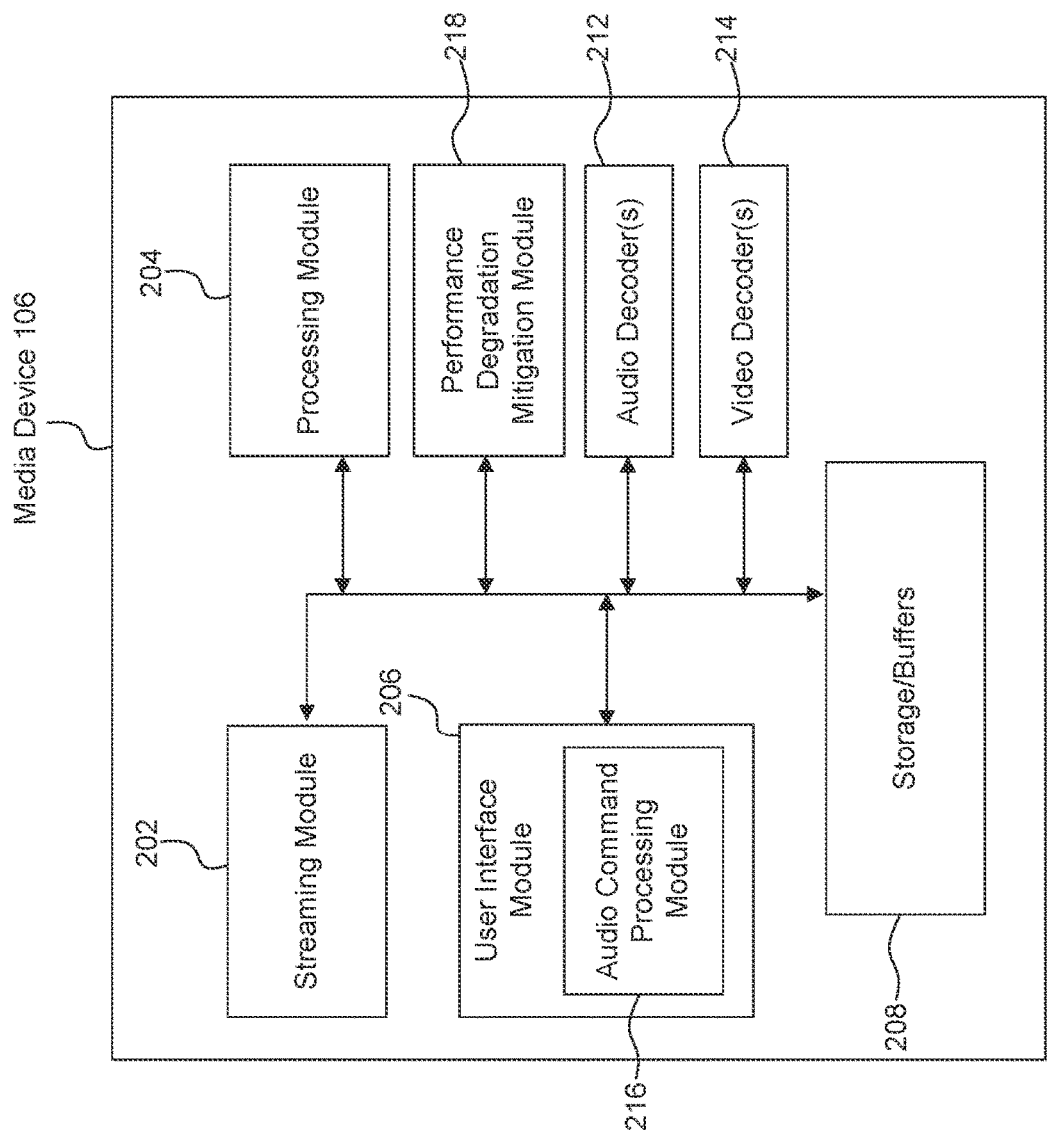
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

System Performance Mitigation Based on Prioritizable Mitigating Actions

As described above, certain implementations for mitigating performance degradation perform mitigation actions in a fixed order that is specified in device firmware. For example, when the amount of available memory reaches a first threshold (e.g., 64 megabytes), callback functions of operating system (OS) components are called to free memory resources for such OS components, followed by terminating background applications and/or decompiling add-ons or other components (e.g., libraries) of the background applications in a predetermined sequence. The order of these actions may not be changed at runtime. Instead, if a change in the order is required, firmware modification may be needed. Moreover, if such actions are performed sequentially, stopped, and then resumed, the first action is performed again instead of resuming from the next action.

Figure 3A:
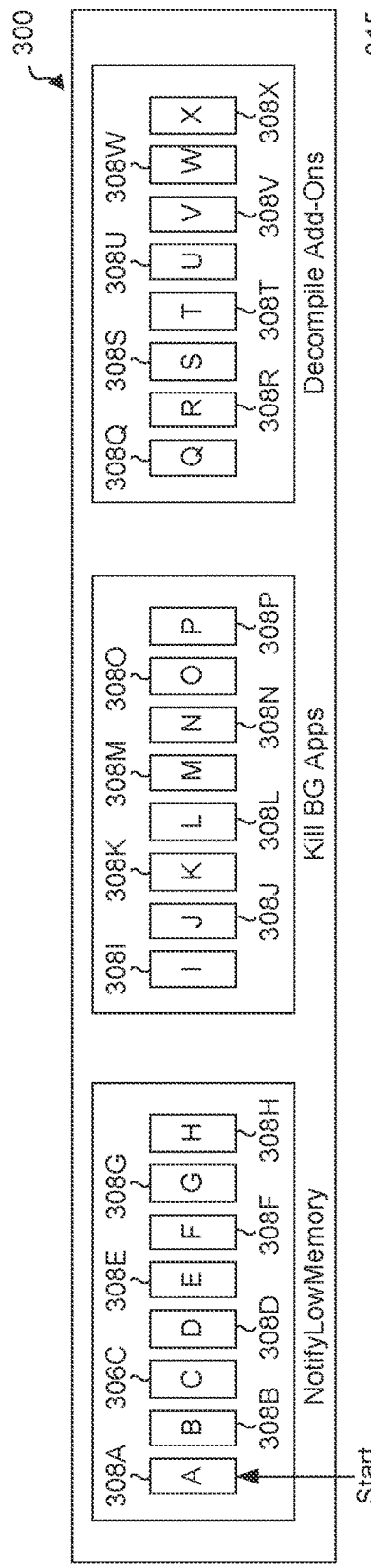
FIGS. 3A-3C illustrate block diagrams of a series of actions, the execution of which has been halted and restarted, according to some embodiments.
Figure 3B:
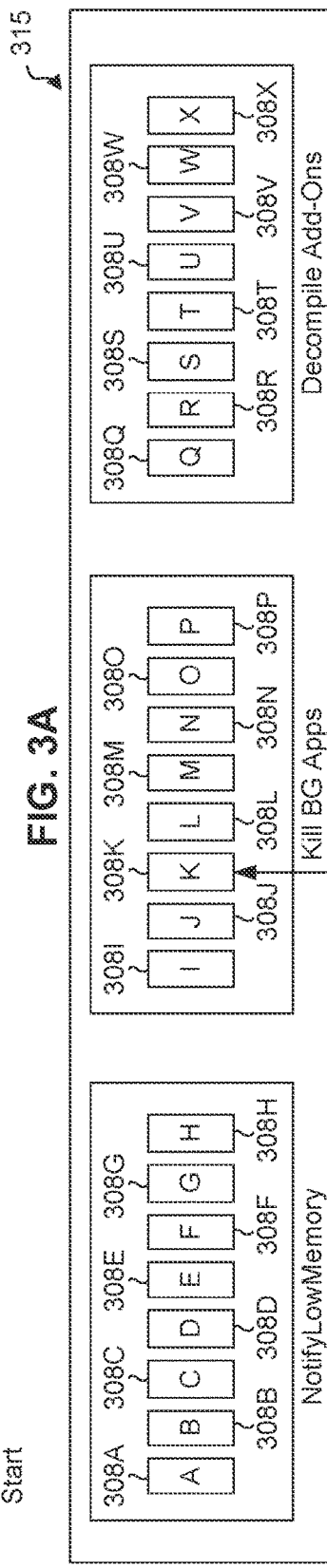
Figure 3C:
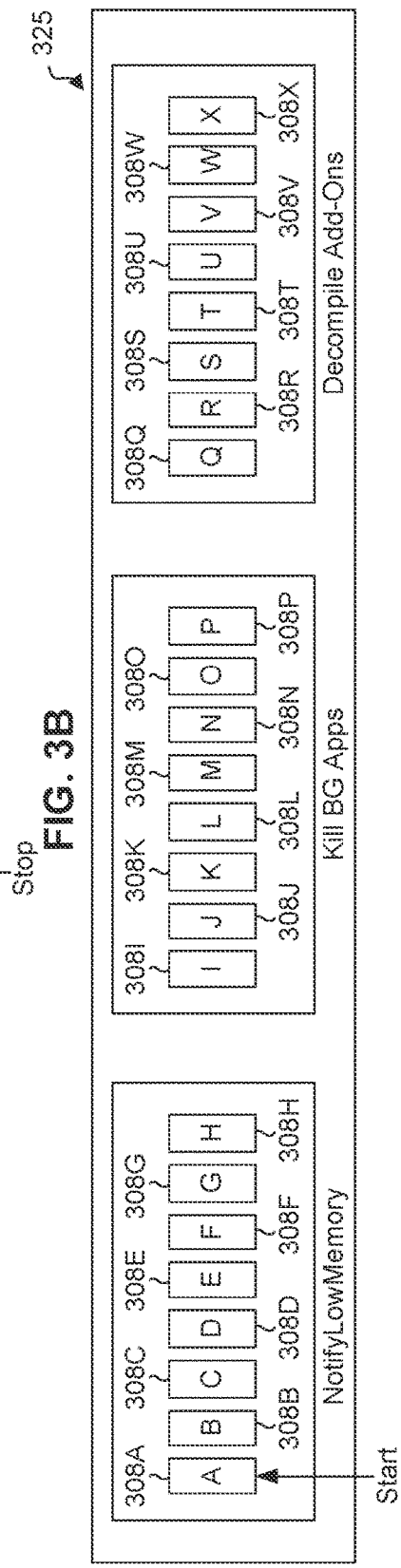

For instance, FIGS. 3A-3C illustrate block diagrams 300, 315, and 325 of a series of mitigating actions, the execution of which has been halted and restarted. For instance, as shown in block diagrams 300, 315, and 325, the actions may include a first group of actions 308A-308H, a second group of actions 308I-308P, and a third group of actions 308Q-308X. Each action in the first group of actions 308A-308H may be a callback function that notifies a corresponding OS component that media device 300 has low memory. Each action in the second group of actions 308I-308P may be configured to terminate a corresponding background application. Each action in the third group of actions 308Q-308X may be configured to decompile an add-on. As shown in FIG. 3A, the first action performed may be action 308A. As shown in FIG. 3B, the execution of actions 308A-308X may be halted (e.g., suspended or stopped) after performing action 308K. Upon resumption of the execution of actions 308A-308X, action 308A is once again performed, followed by actions 308B-308X. This leads to an inefficient usage of compute resources, as actions that have been already performed to mitigate performance degradation are unnecessarily re-performed.

Embodiments described herein may address the foregoing issues described above. For example, referring again to FIG. 2, media device 106 may include a performance degradation mitigation module 218. Performance degradation mitigation module 218 may be configured to receive one or more notifications that utilization of at least one compute resource of media device 106 has met a degradation condition. Based on the notification(s), performance degradation mitigation module 218 may determine a level of performance degradation of media device 106. The level of performance degradation may be referred herein as a severity level. Based on the determined severity level, performance degradation mitigation module 218 may perform one or more actions to mitigate the degradation condition. Performance degradation mitigation module 218 may also receive configuration settings from a data source external to media device 106 (e.g., from performance monitoring configuration component 128 executing on system server(s) 126, an external storage device coupled to media device 106, etc.). Performance degradation mitigation module 218 may receive and implement the configuration settings during runtime (e.g., execution) thereof. The settings may define and/or modify an order in which the action(s) are to be performed. The settings may also map different degradation conditions to different severity levels, and map different severity levels to different actions. Moreover, performance degradation migration module 218 may maintain an indication of the last action performed after the execution of the actions is halted and may resume the execution of the actions from an action subsequent to the last action rather than restarting the actions from the first action.

Figure 4:
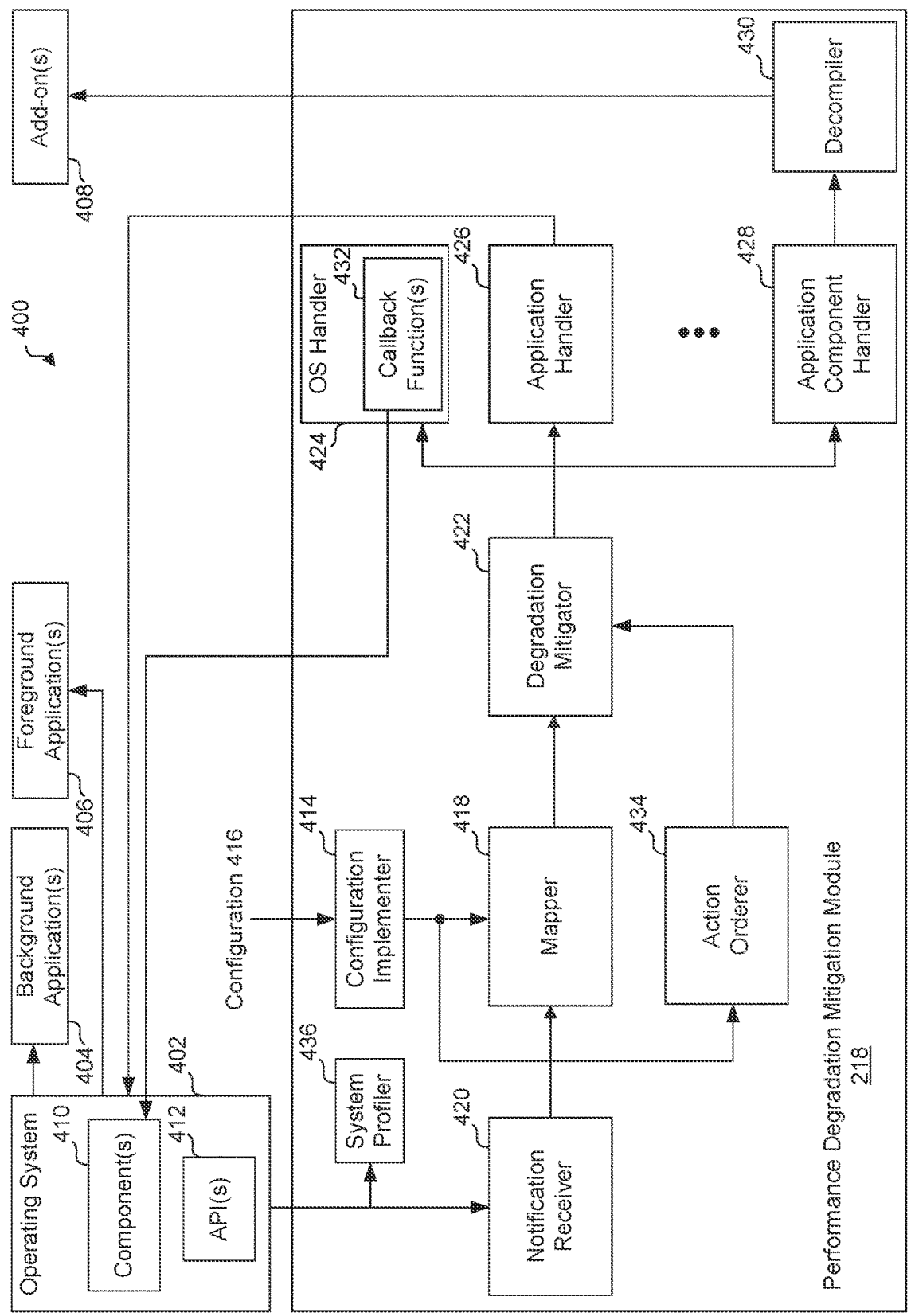
FIG. 4 illustrates a block diagram of a media device, according to some embodiments.

FIG. 4 illustrates a block diagram of a media device 400, according to some embodiments. Media device 400 is an example of media device 106, as described above with reference to FIG. 1. As shown in FIG. 4, media device 400 may comprise an operating system (OS) 402, one or more background applications 404, one or more foreground applications 406, one or more add-ons 408, and performance degradation mitigation module 218. Each of operating system (OS) 402, background application(s) 404, foreground application(s) 406, add-on(s) 408, and/or performance degradation mitigation module 218 may be stored in a memory (e.g., a main or primary memory) during execution thereof by one or more processors (e.g. CPUs). Processing module 204 may be an example of such processor(s). Examples of memory include, but are not limited to, a random access memory (RAM) (e.g., dynamic RAM (DRAM), synchronous DRAM (SDRAM), or dual-data rate RAM (DDR-RAM)).

Operating system 402 may manage one or more hardware components (e.g., processor(s), main memory, secondary memory (e.g., hard disk drives, removable storage devices, etc.)) and software executing on media device 400. Example hardware components are described in detail below in reference to FIG. 9. Examples of software include, but are not limited to, background application(s) 404, foreground application(s) 406, add-on(s) 408, and/or performance degradation mitigation module 218. Operating system 402 may comprise one or more components 410 and one or more application programming interfaces (API(s)) 412. Component(s) 410 may include applications, services, and/or utilities that perform various functions of OS 402. Such functions may include process management, input/output (I/O) device management, file management, network management, main memory management, secondary storage management, security management command interpreter system management, etc. API(s) 412 may be configured to provide notifications (or events) that respectively indicate a particular characteristic of a particular compute resource of media device 400, among other notifications. Performance degradation mitigation module 218 may be configured to register or subscribe to API(s) 412 to receive such notifications.

Examples of compute resources of media device 400 include, but are not limited to, processor(s) of the media device 400, one or more memories of media device 400, one or more networks to which media device 400 is communicatively coupled, one or more storage devices of media device 400, I/O associated with media device 400, etc. Examples of characteristics of such compute resources include, but are not limited to, a measure of processing usage of the processor(s) (e.g., a number of processing cycles of the processor(s) (i.e., CPU utilization)), an amount of free memory (e.g., an amount of memory available for allocation), an amount of delay to perform certain actions due to a lack of memory, a measure of network usage associated with the network(s) (e.g., a number and/or type of network ports utilized for incoming and/or outgoing data packets received by and/or transmitted from media device 400, a number and/or type of network packets (e.g., SYN or ACK packets) transmitted from and/or received by media device 400, the size of the data packets, the time at which the data packets were transmitted and/or received, etc.), a measure of utilization of the storage device(s) (e.g., a number, size, and/or type of I/O operations to and/or from such storage device(s)), etc.) API(s) 412 may also provide notifications associated with other characteristics of media device 400, including, but not limited to, an amount of power consumed by media device 400, the temperature of media device 400, etc.

Background application(s) 404 may include any executing application that is not displayed to, not utilized by, and/or not interacted with by a user. Foreground application(s) 406 may include any executing application that is displayed to, utilized by, and/or interacted with by a user (e.g., via display device(s) 108). Examples of background application(s) 404 and foreground application(s) 406 include, but are not limited to, streaming applications, electronic programming guide applications, gaming applications, etc.

Add-on(s) 408 may be a software component that adds a particular feature to a host application (e.g., background application(s) 404 or foreground application(s) 406). The host application may provide services that add-on(s) 408 may use, including a way for add-on(s) 408 to register themselves with the host application and a protocol for the exchange of data between the host application and add-on(s) 408. Add-on(s) 408 may depend on the services provided by the host application and generally do not operate without the host application (whereas the host application operates independently of the add-on(s) 408). Add-on(s) 408 may be compiled and loaded into main memory when utilized by a particular host application.

Performance degradation mitigation module 218 may comprise a configuration implementer 414, a mapper 418, a notification receiver 420, a degradation mitigator 422, an OS handler 424, an application handler 426, an application component handler 428, a decompiler 430, an action orderer 434, and a system profiler 436. Each of OS handler 424, application handler 426, and application component handler 428 may be handler function configured to perform a particular operation upon receiving a notification (or event). Such operations and notifications are further described below. Each of the components of performance degradation mitigation module 218 may be implemented by processing logic that can comprise hardware (e.g., circuitry, dedicated logic, programmable logic, microcode, etc.), software (e.g., instructions executing on a processing device), or a combination thereof. Each of these components will now be described.

Mapper 418 may map notifications to a plurality of different levels of performance degradation, for example, via a mapping such as a data structure (e.g., a table). Mapper 418 may also map a plurality of different levels of performance degradation to a plurality of different actions via the mapping. For example, FIG. 5 illustrates a data structure 500 representative of a mapping, according to some embodiments. As shown in FIG. 5, data structure 500 may comprise a plurality of columns 502, 504, and 506. Column 502 may specify different levels of performance degradation. Column 504 may specify different conditions (e.g., thresholds) for when a particular mitigation action is to be performed. Column 506 may specify one or more mitigation actions that may be performed when a corresponding threshold for a notification is met. For example, as shown in FIG. 5, when a notification indicates that 64 megabytes of memory is available for media device 400 is received, callback function(s) (e.g., callback function(s) 432) of OS components 410 may be called to free memory resources for each of OS components 410. When a notification indicates that 48 megabytes of memory is available for media device 400 is received, background application(s) 404 may be terminated and certain memory-consuming artifacts (e.g., data) produced by computations performed previously by media device 400 and that later can be restored through the same computations may be deleted from memory (e.g., add-on(s) 408 (or other components (e.g., libraries) of background application(s) 404) may be decompiled). When a notification indicates that 10 megabytes of memory is available for media device 400, foreground application(s) 406 may be terminated. It is noted that the severity levels, thresholds, and actions depicted in data structure 500 are purely exemplary and that data structure 500 may comprise any number of severity levels, where each severity level may be associated with another notification, threshold, and/or action(s) than shown in FIG. 4. It is further noted that data structures other than a table may be utilized to map a plurality of types of notifications to a plurality of different levels of performance degradation.

In some aspects, the mapping of data structure 500 may be configurable during runtime (e.g., execution) of performance degradation mitigation module 218. For example, referring again to FIG. 4, configuration implementer 414 may be configured to receive a configuration 416 for mapper 418. Configuration 416 may be obtained from a data source external to media device 400 (e.g., by performance monitoring configuration component 128, as described above with reference to FIG. 1). Configuration 416 may comprise one or more settings that specify a threshold for a particular notification, and/or action(s) to be mapped to a particular severity level. The setting(s) may be user-defined (e.g., by an administrator) or may be determined in an automated fashion. For instance, performance monitoring configuration component 128 may utilize machine learning-based techniques to determine a set of settings for media device 400. For instance, performance monitoring configuration component 128 may comprise a machine learning model that analyzes historical data collected from a plurality of different media devices (e.g., media device 400). Such data may indicate notifications (or events) indicating characteristics of compute resources that were received by such media devices, along with information indicative of the behavior of such media devices in relation to such notifications (e.g., load times of applications, user engagement metrics with different applications or user interfaces, user interface response times, etc.). Based on such information, the machine learning model learns the severity of performance degradation in relation to the notifications and various thresholds thereof and generates a classification for the notifications and thresholds. Each classification may correspond to a particular severity level. Performance monitoring configuration component 128 may be configured to determine a single classification for all types of media devices, a respective classification for each type of media device, and/or classifications that are specific to a particular media device associated with a particular user.

Configuration implementer 414 may be configured to provide the settings to mapper 418, which updates its mapping based on the parameters. For instance, mapper 418 may update its mapping based on the settings of configuration 416 during runtime of performance degradation mitigation module 218.

Performance monitoring configuration component 128 may also be configured to determine an order in which the actions are to be performed for each of the severity levels and include parameters indicating the order in configuration 416. Performance monitoring configuration component 128 may determine the order based on the usage frequency of applications or components (e.g., OS component(s) 410) of media device 400 and/or an amount of memory freed based on performing each of the actions. Such information may be provided to performance monitoring configuration component 128 by system profiler 436, as described further below. Configuration implementer 414 may provide such parameters to action orderer 434. Action orderer 434 may determine the order in which the actions are to be performed based on the parameters during runtime of performance degradation mitigation module 218. Action orderer 434 may maintain the determined order of the actions via a data structure, such as, but not limited to, a queue, a key-value pair-based data structure (e.g., where the key represents an identifier of the action to be performed, and the value represents the action order number), etc. Action orderer 434 may also be configured to update the order of actions based on parameters included in configuration(s) subsequently received by configuration implementer 414 during runtime of performance degradation mitigation module 218. For instance, action orderer 434 may rearrange the actions in accordance with the parameters. For instance, such parameters may specify that action originally to be performed first is now to be performed last. In accordance with an embodiment in which a key-value pair data structure is utilized to maintain the order of actions, action orderer 434 may update one or more values (or action order numbers) associated with one or more keys (or action identifiers) to indicate the rearranged order.

Figure 6A:
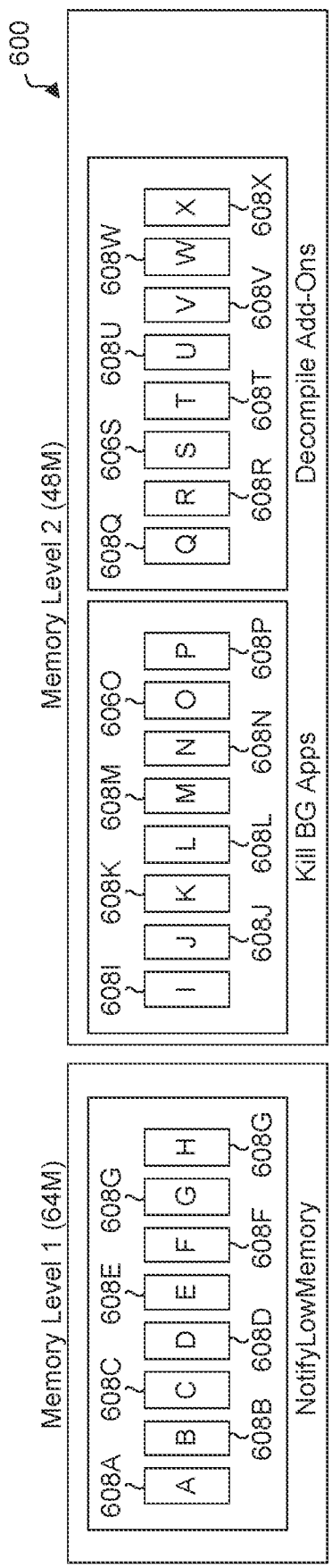
FIG. 6A illustrates a block diagram of a series of actions, according to some embodiments.
Figure 6B:
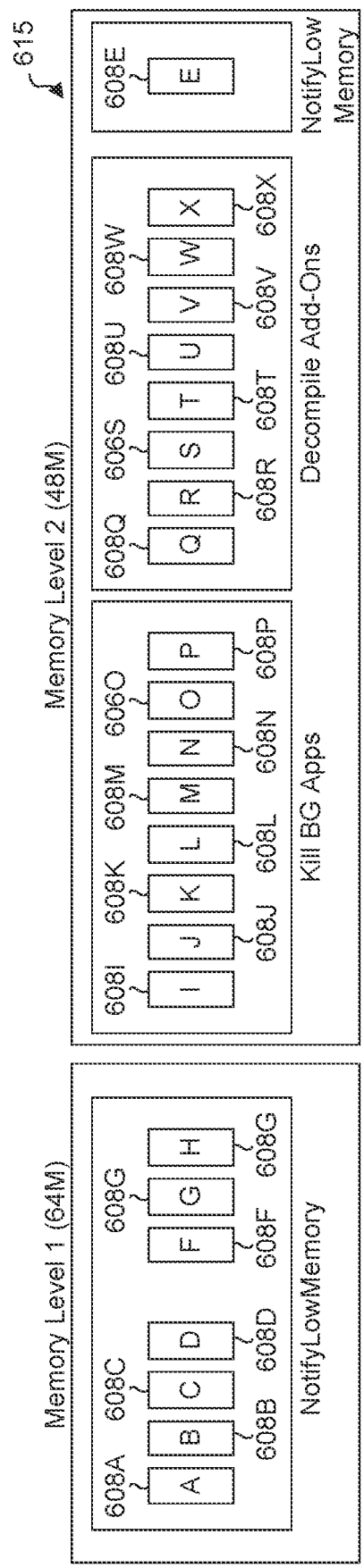
FIG. 6B illustrates a block diagram of a rearranged series of actions, according to some embodiments.

For instance, FIGS. 6A and 6B illustrate block diagrams 600 and 615 of a series of mitigating actions, the execution of which has been halted and resumed, according to an embodiment. As shown in block diagrams 600 and 615, the actions may include a first group of actions 608A-608H, a second group of actions 608I-608P, and a third group of actions 608Q-608X. Each action in the first group of actions 608A-608H may be a callback function that notifies a corresponding OS component of OS component(s) 410 that media device 400 has low memory. Each action in the second group of actions 608I-608P may be configured to terminate a corresponding background application of background application(s) 404. Each action in the third group of actions 608Q-608X may be configured to decompile an add-on of add-on(s) 408. As shown in FIG. 6A, actions 608A-608G may be performed in response to a determination that the severity level is 1 (i.e., the amount of available memory is 64 megabytes), and actions 608I-608X may be performed in response to a determination that the severity level is 2 (i.e., the amount of available memory is 48 megabytes). As shown in FIG. 6A, the first action performed may be action 608A, and the last action performed may be action 608X.

Action orderer 434 may store an indication of each action of actions 608A-608X and an order in which each action of actions 608A-608X are to be performed via the data structure maintained thereby. The order of actions 608A-608X, as shown in FIG. 6A, may be a default order maintained by media device 400 or may be specified via parameters included via a prior configuration (e.g., configuration 416) received by configuration implementer 414. Configuration implementer 414 may receive a subsequent configuration that specifies a different set of parameters indicating a different order. For example, as shown in FIG. 6B, action 608E is now located at the end of the order of actions. Action orderer 434 may update the data structure maintained thereby to indicate the rearranged order of actions. For instance, in accordance with an embodiment in which a key-value pair data structure is utilized to maintain the order of actions, action orderer 434 may update at least the value of action 608E to indicate its new place in the rearranged order. In the example shown in FIG. 6A, action 608E may originally have a value of 5, as it was the fifth action to be performed in the order. After rearranging the order, as shown in FIG. 6B, action 608E may now have a value of 24, as it now the 24$^{th}$ action to be performed. The values of actions 608F-608X may also be updated to reflect the rearranged order.

It is noted that the series of actions (and groups thereof) depicted in FIGS. 6A and 6B are merely exemplary and that any type of action may be rearranged intergroup (e.g., one or more actions performed when a particular severity level is reached may be rearranged with respect to each other) or intragroup (an action may be rearranged such that it is performed when a different severity level is reached, as shown in FIG. 6B).

In some aspects, configuration 416 may comprise a configuration file that specifies the settings for the mapping of mapper 418 and/or the parameters for action orderer 434. The configuration file may be stored in a human-readable or machine-readable form.

Notification receiver 420 may be configured to receive notifications (or events) from API(s) 412. The notifications respectively indicate a particular characteristic of a particular compute resource of media device 400. Notification receiver 420 may provide received notifications to mapper 418. Mapper 418 may be configured to receive, as an input, each notification provided by notification receiver 420 and provide, as an output, an indication of the determined severity level and/or an indication of action(s) to be performed to mitigate the performance degradation of media device 400. The indication of action(s) may be provided to degradation mitigator 422.

Degradation mitigator 422 may be configured to perform one or more actions to mitigate performance degradation of media device 400 based on the indication of the determined severity level, the indication of the action(s) received from mapper 418, and/or an indication of the order of action(s) received from action orderer 434. For example, referring to the example shown in FIG. 5, responsive to receiving an indication of a severity level of 1 and an indication that callback function(s) of OS component(s) 410 are to be called, degradation mitigator 422 may cause notification(s) indicative of the determined severity level to be provided to OS component(s) 410 in the order indicated by action orderer 434. Based on the notification(s), OS component(s) 410 may determine whether data associated therewith is to be deleted, thereby freeing up memory of media device 400. For instance, certain OS component(s) 410 may be configured to cache and/or delete data (e.g., images, still pictures, text, graphics, advertisements, data objects, databases, etc.) associated with background application(s) 404 and/or foreground application(s) 406. Such OS component(s) 410 may delete such data based on receiving the notification. In another example, degradation mitigator 422 may cause a notification to be provided to OS component(s) that instructs OS component(s) 410 to delete data associated therewith (i.e., the determination to delete such data is made by degradation mitigator 422 rather than OS component(s) 410 themselves). To provide such notifications to OS component(s) 410, OS handler 424 may call callback function(s) 432 of OS component(s) 410 that are registered with OS handler 424. Callback function(s) 432, when executed, may provide such notifications to OS component(s) 410. As described herein, callback function(s) 432 may be function(s) that are passed as an argument to another function and are executed after a particular operation has been completed.

In another example, responsive to receiving an indication of a severity level of 2 and/or an indication that background application(s) 404 are to be terminated degradation mitigator 422 may cause background application(s) 404 to be terminated in the order indicated by action orderer 434. For instance, degradation mitigator 422 may provide notifications to application handler 426 to terminate background application(s) 404 in the order indicated by action orderer 434. The notifications may specify which of background application(s) 404 are to be terminated. Upon receiving such notifications, application handler 426 may provide a command to OS 410 to terminate the background application(s) 404.

As depicted in the example shown in FIG. 5, when the severity level is 2, degradation mitigator 422 may also receive an indication from mapper 418 that certain memory-consuming artifacts (e.g., data) produced by computations performed previously by media device 400 and that later can be restored through the same computations are to be deleted from memory responsive to an indication of a severity level of 2. In particular, degradation mitigator 422 may cause add-on(s) 408 (or other components of background application(s) 304) to be decompiled and deleted from memory of media device 400 in the order indicated by action orderer 434. For example, degradation mitigator 422 may provide a notification to application component handler 428 that notifies application component handler 428 to decompile add-on(s) 408 (or other components of background application(s) 404). Responsive to receiving the notification, application component handler 428 may provide a command to decompiler 430 to decompile add-on(s) 408 (or other components of background application(s) 404), thereby freeing up memory of media device 400.

Responsive to receiving an indication of a severity level of 3 and an indication that foreground application(s) 406 are to be terminated, degradation mitigator 422 may cause foreground application(s) 406 to be terminated in the order indicated by action orderer 434. For instance, degradation mitigator 422 may provide notifications to application handler 426 to terminate foreground application(s) 406 in the order indicated by action orderer 434. The notifications may specify which of foreground application(s) 406 are to be terminated. Upon receiving such notifications, application handler 426 may provide a command to OS 410 to terminate the foreground application(s) 406.

It is noted that while the handler functions described herein are configured to mitigate memory-related performance degradation, the embodiments described herein are not so limited. For instance, media device 400 may comprise any number and types of handler functions each configured to perform a particular operation to mitigate different types of performance degradation. For instance, media device 400 may comprise handler function(s) configured to mitigate other types of performance degradation mitigation (e.g., processor-related performance degradation, I/O-related performance degradation, temperature-related performance degradation, etc.). Such handler function(s) may cause OS 410 to scale down a number of processor cores of the processor(s) of media device 400 based on the indication of the determined severity level and/or the indication of the action(s) received from mapper 418, throttle I/O operations based on the indication of the determined severity level and/or the indication of the action(s) received from mapper 418, etc.

Figure 6C:
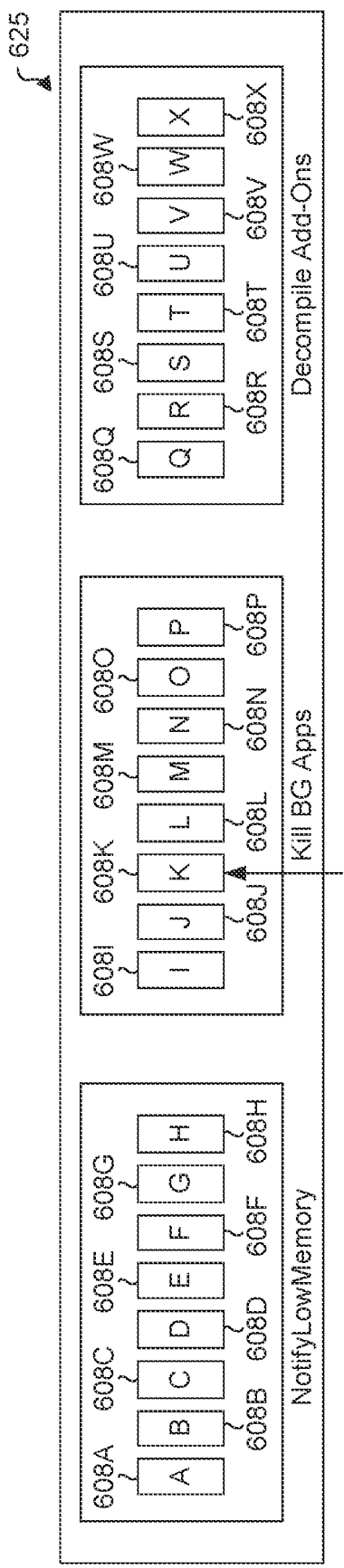
FIGS. 6C and 6D illustrate block diagrams of a series of actions, the execution of which has been halted and resumed, according to some embodiments.
Figure 6D:
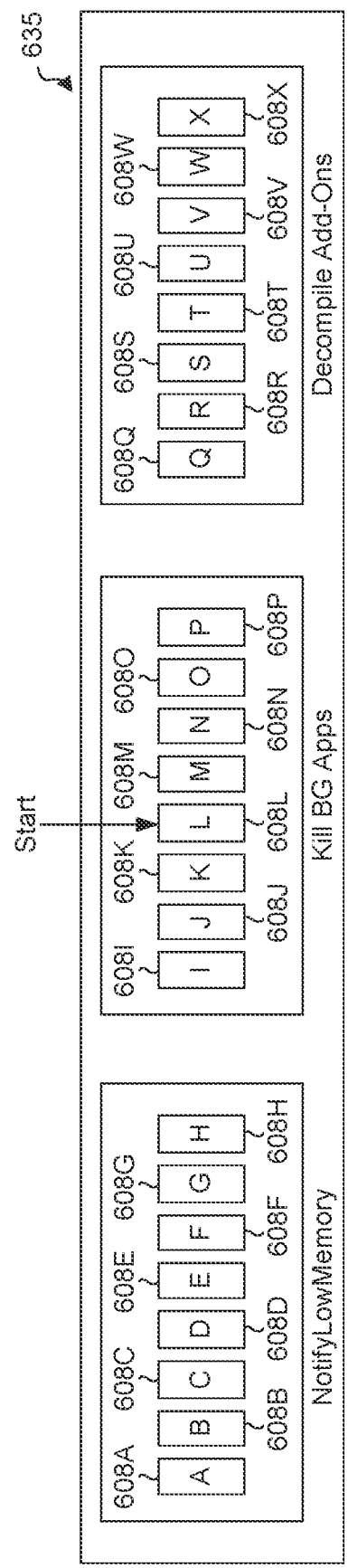

In some embodiments, degradation mitigator 422 may maintain an indication of the last action performed after the execution of the actions is halted and may resume the execution of the actions from an action subsequent to the last action rather than restarting the actions from the first action. For example, as shown in FIG. 6C, the execution of actions 608A-608X may be halted after performing action 608K (e.g., after a determination that the degradation condition no longer exists due to enough memory being freed). Responsive to action 608K being halted, degradation mitigator 422 may maintain an indication that action 608K was the last action performed. After receiving another indication from mapper 418 that the performance degradation has reached a particular severity level, degradation mitigator 422 may resume the execution of the actions by performing an action subsequent to the action indicated by the indication. For example, as shown in FIG. 6D, degradation mitigator 422 may perform action 608L. It is noted that while FIG. 6D indicates that the next action immediate to 608K is performed, any action after action 608K may be performed upon resumption of the execution of actions.

System profiler 436 may be configured to determine a usage frequency of OS component(s) 410, background application(s) 404, foreground application(s) 406, and/or add-on(s) 408. For instance, system profiler 436 may track each time OS component(s) 410, background application(s) 404, foreground application(s) 406, and/or add-on(s) 408 are loaded into memory and/or interacted with by a user. System profiler 436 may receive notifications from API(s) 412 indicating such events. System profiler 436 may provide the usage frequency for each of OS component(s) 410, background application(s) 404, foreground application(s) 406, and/or add-on(s) 408 to performance monitoring configuration component 128.

Performance monitoring configuration component 128 may be configured to determine the order of mitigating actions based on the usage frequency. For instance, performance monitoring configuration component 128 may rank (or prioritize) each of the actions based on the usage frequency of the OS component(s) 410, background application(s) 404, foreground application(s) 406, and/or add-on(s) 408 on which the actions are performed, where the OS component(s) 410, background application(s) 404, foreground application(s) 406, and/or add-on(s) 408 utilized the least may be performed first, and the OS component(s) 410, background application(s) 404, foreground application(s) 406, and/or add-on(s) 408 that are utilized the most may be performed last.

System profiler 436 may also be configured to determine an amount of memory freed after performing each mitigating action. For instance, before OS handler 424, application handler 426, and/or application component handler 428 performs a respective action, system profiler 436 may request API(s) 412 to provide a first indication of an amount of available memory. After each mitigating action is performed, system profiler 602 may request API(s) 412 to provide a second notification of the amount of available memory post-action. For each of OS component(s) 410, background application(s) 404, foreground application(s) 406, and/or add-on(s) 408, system profiler 436 may determine the amount of memory freed as a result of performing the mitigating based on a difference between the amounts of available memory indicated in the first and second notifications. System profiler 436 may provide the determined amount of memory freed for each of OS component(s) 410, background application(s) 404, foreground application(s) 406, and/or add-on(s) 408 to performance monitoring configuration component 128.

Performance monitoring configuration component 128 may be configured to determine the order of mitigating actions based on the amount of memory freed after performing each mitigating action. For instance, performance monitoring configuration component 128 may rank (or prioritize) each of the actions based on the amount of memory freed by performing such actions. In an example, the OS component(s) 410, background application(s) 404, foreground application(s) 406, and/or add-on(s) 408 that result in the most amount of freed memory when an action is performed therefor may be performed first, and the OS component(s) 410, background application(s) 404, foreground application(s) 406, and/or add-on(s) 408 that result in the least amount of freed memory when an action is performed therefor may be performed last.

Figure 7:
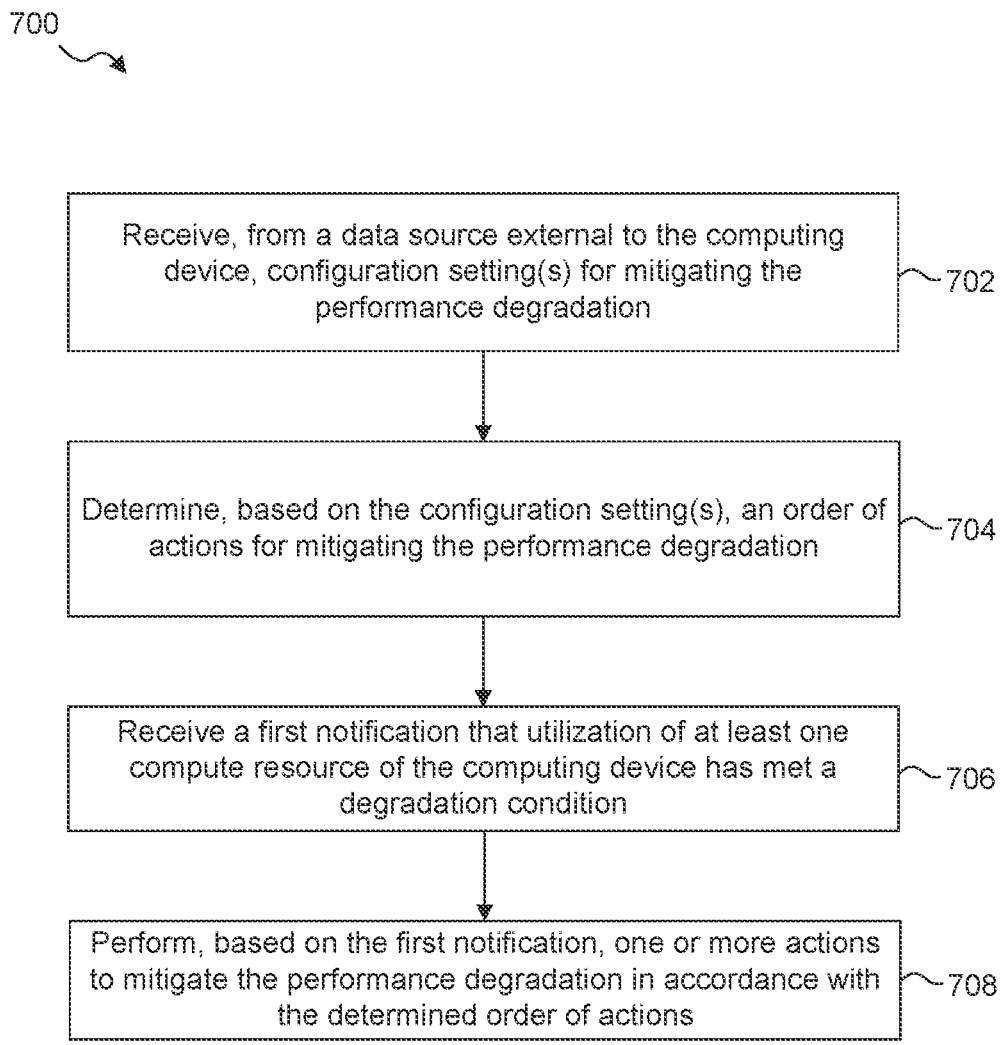
FIG. 7 is a flowchart for a method for mitigating performance degradation of a computing device, according to some embodiments.

FIG. 7 is a flowchart for a method 700 for mitigating performance degradation of a computing device, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to media device 400 of FIG. 4, which is one example of a media device. However, method 700 is not limited to that example embodiment.

In 702, configuration implementer 414 receives, from a data source (e.g., performance monitoring configuration component 128) external to the computing device (e.g., media device 400), configuration setting(s) for mitigating the performance degradation of the computing device.

In 704, action orderer 434 may determine, based on the configuration setting(s), an order of actions for mitigating the performance degradation. As discussed herein, the determined order of actions may be maintained via a data structure, for example, maintained by action orderer 434. Determining the order of actions for mitigating the performance degradation may comprise rearranging, via the data structure, the order of actions such that at least one action of the one or more actions that is configured to be originally performed before a second action of the one or more actions is reconfigured to be performed after the second action. For example, with reference to FIGS. 4, 6A, and 6B, action orderer 434 may rearrange, via the data structure, the order of actions such that at least one action (e.g., action 608E) of the one or more actions that is configured to be originally performed before a second action (e.g., action 608F) of the one or more actions is reconfigured to be performed after the second action.

In 706, notification receiver 420 receives a first notification that utilization of at least one compute resource of the computing device has met a degradation condition. As discussed herein, the degradation condition may be defined by the configuration setting(s). As also discussed herein, the at least one compute resource may comprise at least one of at least one memory of the computing device, at least one processor of the computing device, at least one network to which the computing device is communicatively coupled, or at least one storage device of the computing device. The degradation condition may comprise at least one of an available amount of the at least one memory, a percentage of time processing tasks are delayed based on memory allocation time of the at least one memory meeting or exceeding a first predetermined threshold (e.g., due to memory shortage and fragmentation), a measure of processing usage of the at least one processor meeting or exceeding a third predetermined threshold, a measure of network usage associated with the at least one network meeting or exceeding a fourth predetermined threshold, or a measure of utilization of the at least one storage device meeting or exceeding a fifth predetermined threshold.

In 708, degradation mitigator 422 performs, based on the first notification, action(s) to mitigate the performance degradation in accordance with the determined order of actions. For example, as discussed herein, the action may comprise at least one of causing a second notification indicative of the degradation to be provided to an application or service (e.g., OS component(s) 410) of operating system 402 executing on the computing device, causing at least one add-on (e.g., of add-on(s) 408) installed on the computing device to be decompiled, or causing at least one of a background application (e.g., of background application(s) 404) executing on the computing device or a foreground application (e.g., of foreground application(s) 406) executing on the compute device to be terminated.

In some aspects, action orderer 434 may determine the order of actions for mitigating the performance degradation by determining the order of actions based on at least one a usage frequency of at least one of the application or service (e.g., OS component(s) 410) of operating system 402, the at least one add-on (e.g., of add-on(s) 408), the background application (e.g., of background application(s) 404), or the foreground application (e.g., of foreground application(s) 406), or an amount of memory freed based on each action in the order of actions.

In some aspects, notification receiver 420 may receive a second notification, which is indicative of a characteristic of the compute meeting or exceeding another threshold. In response, degradation mitigator 422 may perform another (e.g., a different) action configured to mitigate the performance degradation.

Figure 8:
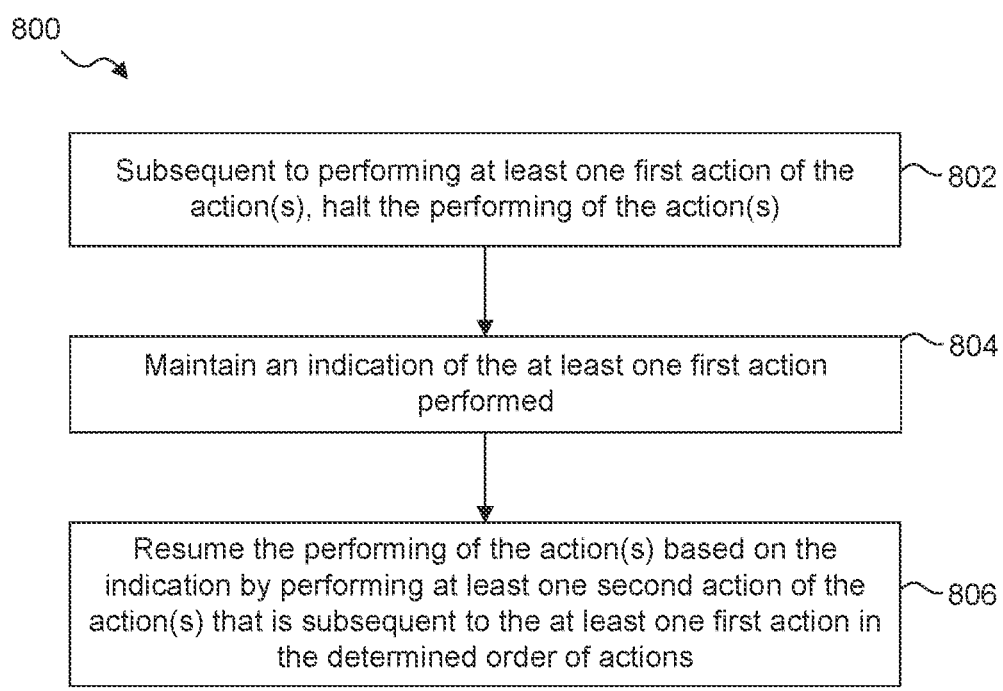
FIG. 8 is a flowchart for a method for halting and resuming mitigating actions, according to some embodiments.

FIG. 8 is a flowchart for a method 800 for halting and resuming mitigating actions, according to an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to media device 400 of FIG. 4, which is one example of a media device. However, method 800 is not limited to that example embodiment.

In 802, subsequent to performing at least one first action (e.g., action 608K, as shown in FIG. 6C) of the action(s), degradation mitigator 422 may halt the performing of the action(s). Degradation mitigator 422 may halt the performing of the action(s) responsive to a determination that the degradation condition has been mitigated (e.g., as a result of enough memory being freed).

In 804, degradation mitigator 422 may maintain an indication of the at least one first action performed.

In 806, degradation mitigator 422 may resume the performing of the action(s) based on the indication by performing at least one second action (e.g., action 608L, as shown in FIG. 6D) of the action(s) that is subsequent to the at least one first action (e.g., action 608K) in the determined order of actions. Degradation mitigator 422 may resume the performing of the action(s) in response to determining that the performance degradation condition still exists or that another performance degradation condition has occurred (e.g., via an indication received from mapper 418).

Example Computer System

Figure 9:
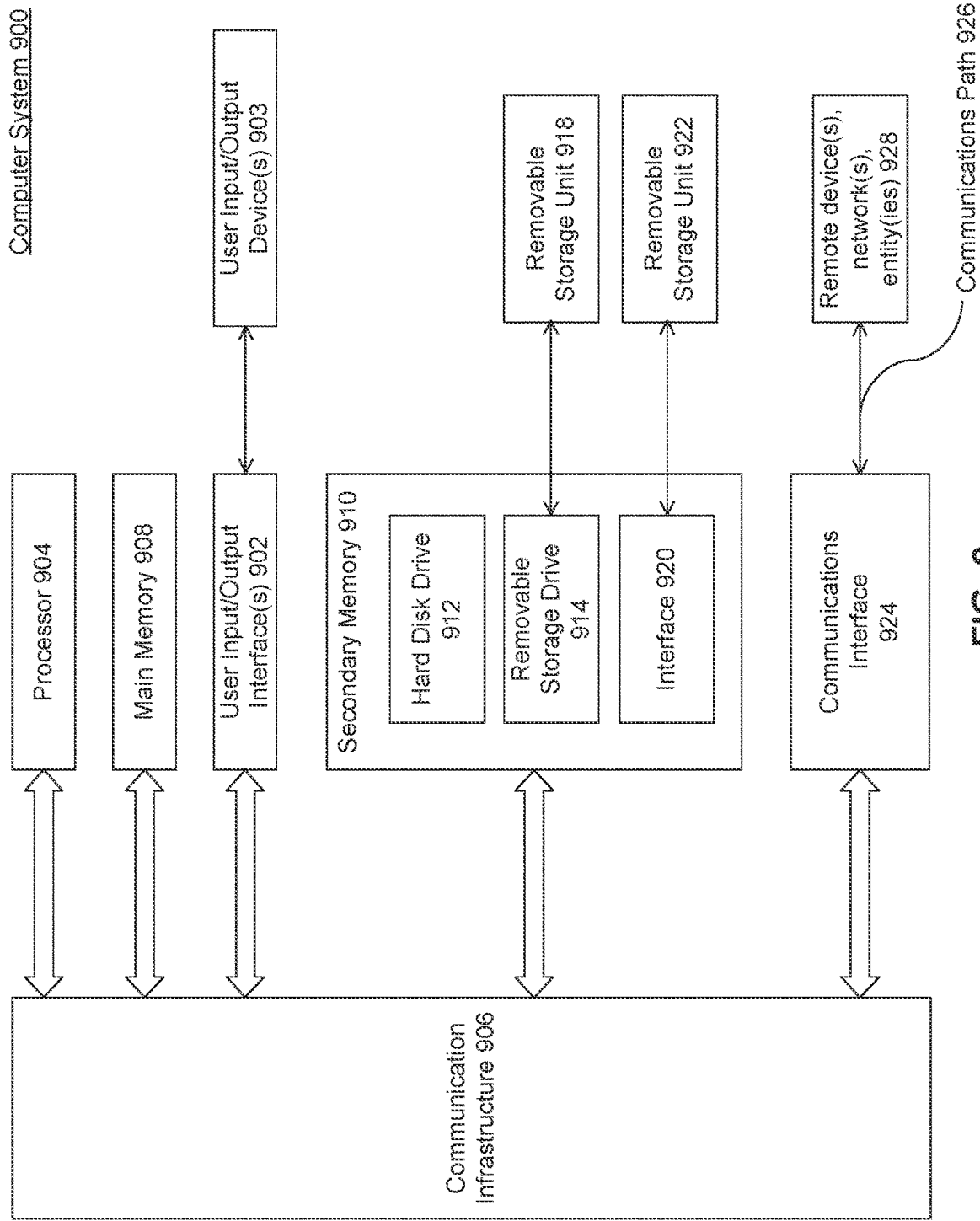
FIG. 9 illustrates an example computer system useful for implementing various embodiments.

Various embodiments may be implemented, for example, using one or more well-known computer systems, such as computer system 900 shown in FIG. 9. For example, one or more of media device 106, remote control 110, content server(s) 120, system server(s) 126, performance monitoring configuration component 128, performance degradation mitigation module 218, media device 400, configuration implementer 414, mapper 418, notification receiver 420, degradation mitigator 422, OS handler 424, application handler 426, application component handler 428, decompiler 430, action orderer 434, and system profiler 436 may be implemented using combinations or sub-combinations of computer system 900. Also or alternatively, one or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for mitigating performance degradation of a computing device, the computer-implemented method comprising:
   receiving, from a data source external to the computing device, one or more configuration settings for mitigating the performance degradation;
   determining, based on the one or more configuration settings, an order of actions for mitigating the performance degradation based on at least an amount of memory freed from each action in the order of actions, wherein a first action in the order of actions results in the most amount of memory freed when compared to other actions in the order of actions;
   receiving a first notification that utilization of at least one compute resource of the computing device has met a degradation condition;
   determining a level of severity of the degradation condition based on the one or more configuration settings; and
   performing, based on the first notification, the first action followed by the other actions to mitigate the performance degradation in accordance with the order of actions and the level of severity.

2. The computer-implemented method of claim 1, wherein the degradation condition is defined by the one or more configuration settings.

3. The computer-implemented method of claim 1, further comprising:
   subsequent to performing at least the first action of the one or more actions, halting the performing of the other actions;
   maintaining an indication of the at least first action performed; and
   resuming the performing of the other actions based on the indication by performing at least one second action of the other actions that is subsequent to the at least first action in the order of actions.

4. The computer-implemented method of claim 1, wherein the order of actions is maintained via a data structure, and wherein determining the order of actions for mitigating the performance degradation comprises:
   rearranging, via the data structure, the order of actions such that at least one action of the one or more actions that is configured to be originally performed before a second action of the one or more actions is reconfigured to be performed after the second action.

5. The computer-implemented method of claim 1, wherein the at least one compute resource comprises at least one of:
   at least one memory of the computing device;
   at least one processor of the computing device;
   at least one network to which the computing device is communicatively coupled; or
   at least one storage device of the computing device.

6. The computer-implemented method of claim 5, wherein the degradation condition comprises at least one of:
   an available amount of the at least one memory meeting a first predetermined threshold;
   a percentage of time tasks are delayed based on a memory allocation time of the at least one memory meeting a second predetermined threshold;
   a measure of processing usage of the at least one processor meeting a third predetermined threshold;
   a measure of network usage associated with the at least one network meeting a fourth predetermined threshold; or
   a measure of utilization of the at least one storage device meeting a fifth predetermined threshold.

7. The computer-implemented method of claim 1, wherein the one or more actions comprise at least one of:
   causing a second notification indicative of the degradation condition to be provided to an application or service of an operating system executing on the computing device;
   causing at least one add-on installed on the computing device to be decompiled; or
   causing at least one of a background application executing on the computing device or a foreground application executing on the computing device to be terminated.

8. The computer-implemented method of claim 7, wherein determining the order of actions for mitigating the performance degradation comprises:
   determining the order of actions based on the amount of memory freed based on each action in the order of actions and
   a usage frequency of at least one of the application or service of the operating system, the at least one add-on, the background application, or the foreground application.

9. A system for mitigating performance degradation of a computing device, comprising:
   one or more memories; and
   at least one processor each coupled to at least one of the one or more memories and configured to perform operations comprising:
      receiving, from a data source external to the computing device, one or more configuration settings for mitigating the performance degradation;
      determining, based on the one or more configuration settings, an order of actions for mitigating the performance degradation based on at least an amount of memory freed from each action in the order of actions, wherein a first action in the order of actions results in the most amount of memory freed when compared to other actions in the order of actions;

receiving a first notification that utilization of at least one compute resource of the computing device has met a degradation condition;

determining a level of severity of the degradation condition based on the one or more configuration settings; and performing, based on the first notification, the first action followed by the other actions to mitigate the performance degradation in accordance with the order of actions and the level of severity.

10. The system of claim 9, wherein the degradation condition is defined by the one or more configuration settings.

11. The system of claim 9, wherein the operations further comprise:

subsequent to performing at least the first action of the one or more actions, halting the performing of the other actions;

maintaining an indication of the at least first action performed; and resuming the performing of the other actions based on the indication by performing at least one second action of the other actions that is subsequent to the at least first action in the order of actions.

12. The system of claim 9, wherein the order of actions is maintained via a data structure, and wherein determining the order of actions for mitigating the performance degradation comprises:

rearranging, via the data structure, the order of actions such that at least one action of the one or more actions that is configured to be originally performed before a second action of the one or more actions is reconfigured to be performed after the second action.

13. The system of claim 9, wherein the at least one compute resource comprises at least one of:

the one or more memories;

the at least one processor;

at least one network to which the computing device is communicatively coupled; or at least one storage device of the computing device.

14. The system of claim 13, wherein the degradation condition comprises at least one of:

an available amount of the one or more memories meeting a first predetermined threshold;

a percentage of time tasks are delayed based on a memory allocation time of the one or more memories meeting a second predetermined threshold;

a measure of processing usage of the at least one processor meeting a third predetermined threshold;

a measure of network usage associated with the at least one network meeting a fourth predetermined threshold; or a measure of utilization of the at least one storage device meeting a fifth predetermined threshold.

15. The system of claim 9, wherein the one or more actions comprise at least one of:

causing a second notification indicative of the degradation condition to be provided to an application or service of an operating system executing on the computing device;

causing at least one add-on installed on the one or more memories to be decompiled; or causing at least one of a background application executing on the computing device or a foreground application executing on the computing device to be terminated.

16. The system of claim 15, wherein determining the order of actions for mitigating the performance degradation comprises:

determining the order of actions based on the amount of memory freed based on each action in the order of actions and a usage frequency of at least one of the application or service of the operating system, the at least one add-on, the background application, or the foreground application.

17. A non-transitory computer-readable medium having instructions stored thereon that, when executed by at least one computing device, cause the at least one computing device to perform operations comprising:

receiving, from a data source external to the at least one computing device, one or more configuration settings for mitigating performance degradation of the at least one computing device;

determining, based on the one or more configuration settings, an order of actions for mitigating the performance degradation based on at least an amount of memory freed from each action in the order of actions, wherein a first action in the order of actions results in the most amount of memory freed when compared to other actions in the order of actions;

receiving a first notification that utilization of at least one compute resource of the at least one computing device has met a degradation condition;

determining a level of severity of the degradation condition based on the one or more configuration settings; and performing, based on the first notification, the first action followed by the other actions to mitigate the performance degradation in accordance with the order of actions and the level of severity.

18. The non-transitory computer-readable medium of claim 17, wherein the degradation condition is defined by the one or more configuration settings.

19. The non-transitory computer-readable medium of claim 17, the operations further comprising:

subsequent to performing at least the first action of the one or more actions, halting the performing of the other one or more actions;

maintaining an indication of the at least first action performed; and resuming the performing of the other actions based on the indication by performing at least one second action of the other actions that is subsequent to the at least first action in the order of actions.

20. The non-transitory computer-readable medium of claim 17, wherein the order of actions is maintained via a data structure, and wherein determining the order of actions for mitigating the performance degradation comprises:

rearranging, via the data structure, the order of actions such that at least one action of the one or more actions that is configured to be originally performed before a second action of the one or more actions is reconfigured to be performed after the second action.

\* \* \* \* \*